United States Patent [19]

Raveh

[11] Patent Number: 4,631,908
[45] Date of Patent: Dec. 30, 1986

[54] PICKER SPINDLE ASSEMBLY FOR COTTON PICKERS

[76] Inventor: David Raveh, 83A Einstein St., Haifa, Israel

[21] Appl. No.: 714,625

[22] Filed: Mar. 21, 1985

[30] Foreign Application Priority Data

Mar. 30, 1984 [IL] Israel ........................ 71411

[51] Int. Cl.⁴ ..................... A01D 46/08; A01D 46/18
[52] U.S. Cl. ........................................... 56/50; 56/28; 403/7
[58] Field of Search .................... 56/28, 40, 41, 44, 50, 56/43; 464/179, 182, 184; 403/7; 384/248, 249, 250, 251, 264

[56] References Cited

U.S. PATENT DOCUMENTS

| | | | |
|---|---|---|---|
| 781,426 | 1/1905 | Hollingworth | 384/250 |
| 1,538,573 | 5/1925 | Minney | 384/251 |
| 2,010,525 | 8/1935 | McHugh | 403/7 |
| 2,204,484 | 6/1940 | Foster | 464/184 |
| 2,394,947 | 2/1946 | Stephens | 464/182 |
| 2,664,689 | 1/1954 | Walker et al. | 56/41 |
| 2,702,214 | 2/1955 | Turner | 403/7 |
| 2,845,767 | 8/1958 | Crawford | 56/41 |
| 2,899,806 | 8/1959 | Fye | 464/184 |
| 3,040,506 | 6/1962 | Lindsay | 56/43 |
| 3,429,228 | 2/1969 | Stoicz | 384/264 |
| 3,464,193 | 9/1969 | Mason | 56/47 |

FOREIGN PATENT DOCUMENTS

| | | | |
|---|---|---|---|
| 232647 | 4/1969 | U.S.S.R. | 56/44 |
| 473492 | 10/1975 | U.S.S.R. | 56/41 |
| 974961 | 11/1982 | U.S.S.R. | 56/41 |

Primary Examiner—Robert Peshock
Assistant Examiner—David I. Tarnoff
Attorney, Agent, or Firm—Benjamin J. Barish

[57] ABSTRACT

A picker spindle assembly for cotton pickers includes a plurality of vertically extending picker bars each mounted to a pedestal flange via a bar pivot, each bar pivot carrying a plurality of horizontally extending spindle pickers. Each of the bar pivots is threadedly mounted to a mounting plate secured to the pedestal flange to permit vertical adjustment of the spindle pickers.

4 Claims, 4 Drawing Figures

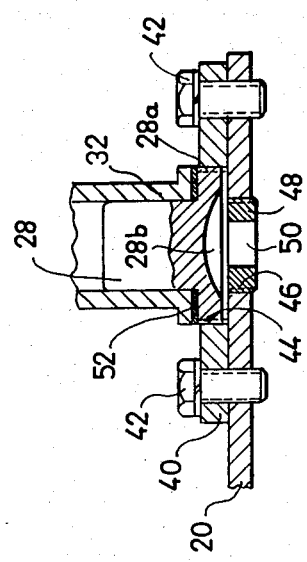
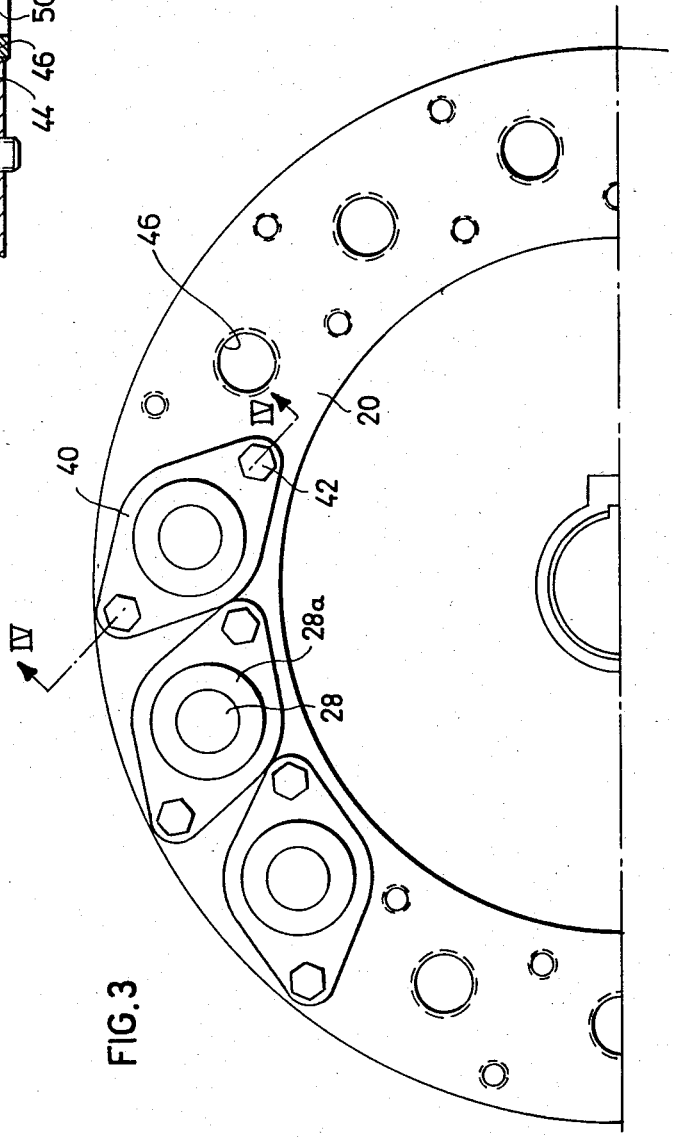
FIG. 4
FIG. 3

PICKER SPINDLE ASSEMBLY FOR COTTON PICKERS

BACKGROUND OF THE INVENTION

The present invention relates to cotton pickers, and particularly to picker spindle assemblies included in cotton pickers.

The conventional cotton picker includes one or more (usually two) picker spindle assemblies each comprising a plurality of vertically-extending picker bars mounted to a pedestal flange via a bar pivot, each picker bar carrying a plurality of horizontally-extending spindle pickers. Each picker spindle assembly is rotated about its vertical axis so as to pass the horizontally-extending picker spindles through a moistening station wherein the picker spindles are moistened by a spindle moistener assembly, and then through a doffer station wherein the cotton is removed from the picker spindles by a doffer assembly.

Because of wear and tear, it is frequently necessary to adjust the vertical position of the spindle pickers with respect to the moistener and doffer assemblies. In the present construction of the picker spindle assembly, this is usually done by loosening the picker bars and their bar pivots, and adding one or more shims between the bar pivots and the pedestal flange. Such a procedure is time-consuming, unpleasant to perform, and requires the maintenance of different sized shims. Moreover, these drawbacks usually cause cotton pickers to experience a considerable down-time period for repair and adjustment purposes, which not only increases the expense of operation and maintenance of the cotton pickers, but also can cause considerable difficulty during the cotton-harvesting period by delaying the completion of the harvest and thereby subjecting the cotton crop to the risk of damage by early rainfall.

An object of the present invention is to provide a picker spindle assembly for cotton pickers having advantages in the above respects.

SUMMARY OF THE INVENTION

According to a broad aspect of the present invention, there is provided a picker spindle assembly for cotton pickers including a plurality of vertically-extending picker bars each mounted to a pedestal flange via a bar pivot, each bar pivot carrying a plurality of horizontally-extending spindle pickers. Each of the bar pivots is threaded at one end for threadedly mounting the bar pivot to the pedestal flange. The threaded end of each bar pivot is formed with a screw-driver slot to permit rotation of the bar pivot and, thereby, vertical adjustment of the spindle pickers carried by it. The pedestal flange is formed with an opening therethrough for each bar pivot to provide access to the screw-driver slot thereof. The assembly further includes a threaded locking nut for each bar pivot locking it in adjusted position.

In the preferred embodiment of the invention described below, the bar pivots are threadedly mounted to a mounting plate secured to the pedestal flange. There is a separate mounting plate for each of the bar pivots, each of the bar pivots being formed with an enlarged head which is externally threaded and is received in a threaded opening formed in its respective mounting plate.

According to a still further important feature in the described preferred embodiment, each of the openings formed in the pedestal flange is threaded and receives the threaded locking nut for locking its respective bar pivot in adjusted position, each of the locking nuts being formed with a central opening to provide access to the screw-driver slot of the respective bar pivot.

Picker spindle assemblies constructed in accordance with the foregoing features provide a number of important advantages over presently used constructions. Thus, the adjustment of the vertical height of the spindle pickers can be quickly and simply executed, whenever desired, by merely loosening the threaded locking nut, inserting a screw-driver through its opening into the screw-driver slot formed in the head of the bar pivot, rotating the bar pivot, and then retightening the locking nut. The downtime period of the cotton picker for adjustment purposes can therefore be substantially reduced, which is particularly important in areas, such as Israel, where a harvest may be threatened by early rain; moreover, there is no need to maintain an inventory of shims, as required in the present constructions of picker spindle assemblies.

Further features and advantages of the invention will be apparent from the description below.

BRIEF DESCRIPTION OF THE DRAWINGS

The invention is herein described by way of example only, with reference to the accompanying drawings, wherein:

FIG. 3 is a top plan view illustrating a portion of the picker spindle assembly constructed in accordance with the present invention; and FIG. 4 is a sectional view along lines IV—IV of FIG. 3.

DESCRIPTION OF A PREFERRED EMBODIMENT

Figure 1:
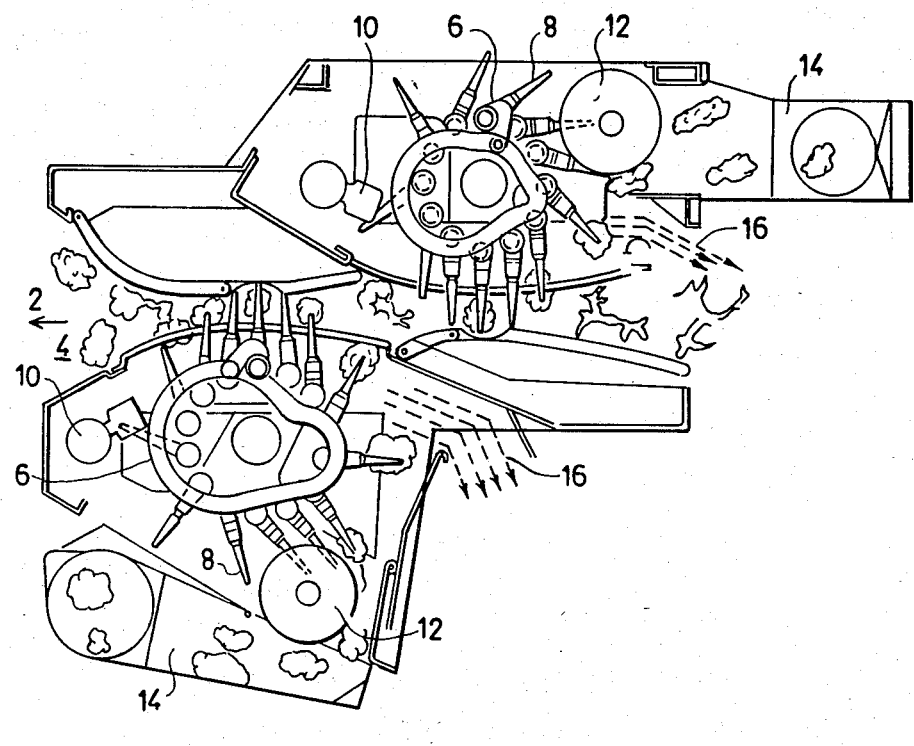
FIG. 1 is a diagram illustrating, from the top, one form of cotton picker in which the invention is particularly useful.

With reference first to FIG. 1, there is diagramatically illustrated, from the top, a cotton picker of the type in which the invention is particularly useful. Such a cotton picker is driven, usually by its own drive, in the direction of arrow 2 so as to intercept the cotton in a picking zone 4. The illustrated cotton picker includes two picker spindle assemblies, each generally designated 6. Each is provided with a plurality of horizontally-extending spindle pickers 8 which are rotated to pick-up the cotton within the picking zone 4. Before the spindle pickers 8 arrive into the picker zone 4, they first pass through a moistening zone occupied by a spindle moistener assembly 10 wherein each spindle picker is moistened by water to better enable it to pickup the cotton in the picking zone 4. Further rotation of the picker assembly 6 brings their spindle pickers 8 to a doffer zone where a doffer assembly 12 removes ("doffs") the cotton from the spindle pickers and directs it to a storage zone 14. The spindle pickers 3 "doffed" of the cotton are then brought back to the spindle moistener assemblies 10 for remoistening before passing again through the picking zone 4 for picking up additional cotton.

In the machine illustrated in FIG. 1, the upper picker spindle assembly 8 is rotated clockwise to deliver the picked cotton into the upper storage zone 14 while passing the trash through the upper trash opening 16; and the lower picker spindle assembly 6 is rotated counter-clockwise to deliver the cotton to the lower sortage zone 14 while passing the trash through the lower trash opening 16.

Figure 2:
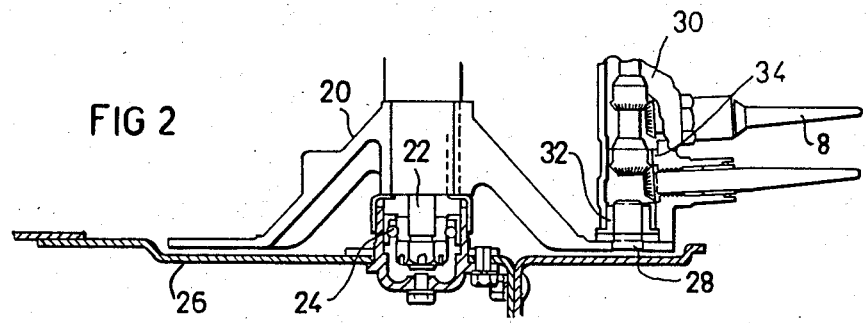
FIG. 2 is a fragmentary side elevational view illustrating the portion of the picker spindle assembly in the cotton picker of FIG. 1 which embodies the present invention.

As shown in FIG. 2, each picker spindle assembly 6 includes a pedestal flange 20 secured to a rotor shaft 22 rotatably mounted by a bearing 24 to the bottom plate 26 of the machine. Each pedestal flange 20 further carries a plurality of bar pivots 28, each supporting a vertically-extending picker bar 30 carrying the horizontally-extending spindle pickers 8. The picker bars 30 are pivotably mounted to the bar pivots 28 by a pivot bushing 32, and the spindle pickers 8 are rotatable by means of gearing 34.

Such cotton pickers, insofar as described above, are well-known and therefore further details of the construction and operation of these machines are not set forth herein.

As briefly described earlier, it is frequently necessary to adjust the vertical position of the spindle pickers 8 with respect to the moistener assemblies 10 and doffer assemblies 12; and this is done in the conventional construction, by inserting shims between the bar pivots 28 and their respective pedestal flange 20. As further described above, this is an unpleasant, inconvenient and time-consuming task, resulting in considerable downtime of the machine for repair and adjustment purposes, and also requires the maintenance of an inventory of shims.

The novel picker spindle assembly illustrated in FIGS. 3 and 4, constructed in accordance with the present invention, avoids the foregoing drawbacks in the conventional construction of picker spindle assemblies.

Thus, as shown in FIGS. 3 and 4, each bar pivot 28 is mounted to the pedestal flange 20 by means of a mounting plate 40 having a pair, of opposed ears secured to the pedestal flange by bolts 42. Each mounting plate 40 is formed with a threaded opening 44 for threadedly receiving its respective pivot bar 28. For this purpose, each pivot bar 28 is formed with an enlarged head 28a which is externally threaded for reception within threaded opening 44 of mounting plate 40. In addition, the outer face of the enlarged head 28a of each bar pivot is formed with a screw-driver slot 28b.

In the novel picker spindle assembly, as illustrated in FIGS. 3 and 4, the pedestal flange 20 is formed with an opening 46 aligned with the head 28a of each bar pivot 28 to provide access to the screw-driver slot 28b of the bar pivot. Openings 46 are threaded and receive externally-threaded locking nuts 48, which locking nuts are also formed with central openings to provide access to the screw-driver slot 28b of the respective bar pivot. Nut 48 is adapted to be threaded into contact with the confronting face of its bar pivot head 28a in order to lock the latter in position.

Preferably, a bearing ring 52 is interposed between the upper face of the bar pivot head 28a and the lower face of the pivot bushing 32, so as to reduce wear and tear between these surfaces.

It will be seen that the foregoing construction permits each picker spindle assembly 6 to be vertically adjusted to precisely locate its spindle pickers 8 with respect to their respective moistener assemblies 10 and doffer assembly 12, in the following manner:

Whenever an adjustment is required, locking nut 48 is unthreaded from contact with bar pivot head 28a by a screw-driver received within opening 50 of the locking nut. For this purpose, opening 50 is preferably of square or other non-circular configuration so as to permit the screw-driver to rotate it. The screw-driver is then inserted into the screw-driver slot 28b of the bar pivot 28, and the latter is rotated so as to bring its spindle pickers 8 to the required vertical positions with respect to the moistener assemblies 10 and doffer assemblies 12. Locking nut 48 may then be threaded back into engagement with the bar pivot head 28a for firmly locking it in its new adjusting position.

While the invention has been described with respect to one preferred embodiment, it will be appreciated that many other variations, modifications and other applications of the invention may be made.

What is claimed is:

1. A picker spindle assembly for cotton-pickers including: a plurality of vertically-extending picker bars each mounted to a pedestal flange via a bar pivot; each bar pivot carrying a plurality of horizontally-extending spindle pickers; and a mounting plate carried by said flange; each of said bar pivots being formed with an enlarged head which is externally threaded and received in a threaded opening formed in said mounting plate to permit vertical adjustment of the spindle pickers; said one end of each bar pivot being formed with a screw-driver slot to permit rotation of the bar pivot and, thereby, vertical adjustment of the spindle pickers carried thereby; said pedestal flange being formed with an opening therethrough for each bar pivot to provide access to said screw-driver slot thereof; and a threaded locking nut for each bar pivot locking it in an adjusted position; each of said openings formed in said pedestal flange being threaded and receiving said locking nut for locking its respective bar pivot in adjusted position; each of said locking nuts being formed with a central opening to provide access to said screw-driver slot of the respective bar pivot.

2. The picker spindle assembly according to claim 1, further including a pivot bushing mounted on the enlarged head of each pivot bar, and a bearing ring interposed between said pivot bushing and said enlarged head of the bar pivot.

3. The picker spindle assembly according to claim 1, wherein there is a separate mounting plate for each of said bar pivots, each of said mounting plates being formed with a pair of opposed ears mounted to said pedestal flange by bolts.

4. A cotton picker including a picker spindle assembly according to claim 1.

* * * * *